(12) United States Patent
Li et al.

(10) Patent No.: US 10,312,753 B2
(45) Date of Patent: Jun. 4, 2019

(54) SINGLE PHASE PERMANENT MAGNET MOTOR

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 141 days.

(21) Appl. No.: 15/254,502

(22) Filed: Sep. 1, 2016

(65) Prior Publication Data

US 2017/0063173 A1   Mar. 2, 2017

(30) Foreign Application Priority Data

Sep. 1, 2015   (CN) .......................... 2015 1 0551833

(51) Int. Cl.
*H02K 1/14*   (2006.01)
*H02K 21/18*   (2006.01)
*H02K 1/27*   (2006.01)

(52) U.S. Cl.
CPC ........... *H02K 1/143* (2013.01); *H02K 21/185* (2013.01); *H02K 1/276* (2013.01)

(58) Field of Classification Search
CPC .......... H02K 1/27; H02K 21/02; H02K 11/21; H02K 1/2753; H02K 29/03; H02K 29/08; H02K 1/148; H02K 7/04; H02K 1/2773
See application file for complete search history.

(56) References Cited

U.S. PATENT DOCUMENTS

| | | | | |
|---|---|---|---|---|
| 4,691,132 A | * | 9/1987 | Bertram et al. | 310/156.15 |
| 6,012,217 A | * | 1/2000 | Kliman et al. | 29/596 |
| 2015/0042194 A1 | * | 2/2015 | Li et al. | 310/156.01 |

* cited by examiner

*Primary Examiner* — Naishadh N Desai
(74) *Attorney, Agent, or Firm* — Muncy, Geissler, Olds & Lowe, P.C.

(57) ABSTRACT

A single phase permanent magnet motor includes a stator core and a permanent magnet rotor rotatably disposed in the stator core. The stator core includes an end portion and a pole arm extending from the end portion. The pole arm includes two connecting arms connected to the end portion and two pole claws formed at distal ends of the connecting arms. The permanent magnet rotor is disposed between the two pole claws. The rotor comprises a rotor core and a plurality of permanent magnets embedded in the rotor core, and the rotor core is made of a magnetic material.

10 Claims, 4 Drawing Sheets

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510551833.1 filed in The People's Republic of China on 1 Sep. 2015.

FIELD OF THE INVENTION

The present invention relates to single phase permanent magnet motors, and in particular to a single phase permanent magnet motor including a rotor having an inserted permanent magnet.

BACKGROUND OF THE INVENTION

A single phase permanent magnet motor usually includes a stator core, stator windings, and a permanent magnet rotor. The stator core is generally U-shaped, including a pair of pole arms. A pair of magnetic poles is formed at distal ends of the pole arms. The permanent magnet rotor is rotatably disposed between the magnetic poles of the stator core. The permanent magnet rotor includes a rotary shaft and a permanent magnetic member fixed to the rotary shaft using an over-molding process. The present invention provides a new single phase permanent magnet motor.

SUMMARY OF THE INVENTION

Accordingly, the present invention provides a single phase permanent magnet motor comprising: a stator core comprising an end portion and a pole arm extending from the end portion, the pole arm comprising two connecting arms connected to the end portion and two pole claws formed at distal ends of the connecting arms, and a permanent magnet rotor rotatably disposed in the stator core between the two pole claws, the rotor comprising a rotor core and a plurality of permanent magnets embedded in the rotor core, and the rotor core being made of a magnetic material.

Preferably, the permanent magnet has a thickness in a radial direction of the rotor less than a width in a tangential direction of the rotor.

Preferably, the permanent magnet has a thin cuboid shape.

Preferably, the at least one permanent magnet comprises two permanent magnets, and the two permanent magnets are disposed in parallel with and spaced from each other.

Preferably, an outer wall surface of the rotor core forms two arc surfaces corresponding to the two permanent magnets, respectively, and each arc surface covers a corresponding permanent magnet in a circumferential direction.

Preferably, the outer wall surface of the rotor core further comprises two plane surfaces connected between ends of the two arc surfaces.

Preferably, the two pole claws are connected together and form a wall portion between the two connecting arms, a magnetic bridge is formed at a middle of the wall portion, and the wall portion has a minimum radial thickness at the area of the magnetic bridge.

Preferably, an outer wall surface of the magnetic bridge is formed with at least one groove.

Preferably, the groove extends axially in the magnetic bridge.

Preferably, an inner surface of the pole claws of the stator core is recessed inwardly to form two startup grooves, and the two startup grooves are offset from a central axis of the pole claws and are spaced 180 degrees in the circumferential direction.

Preferably, the end portion and the pole arm are respectively formed by stacking a plurality of laminations and are mechanically connected, one of the connecting arm of the pole arm and the end portion forms a locking groove, the other of the connecting arm of the pole arm and the end portion forms a locking block, and the locking block is engaged in the locking groove to connect the pole arm and the end portion.

DETAILED DESCRIPTION OF THE PREFERRED EMBODIMENTS

Figure 1:
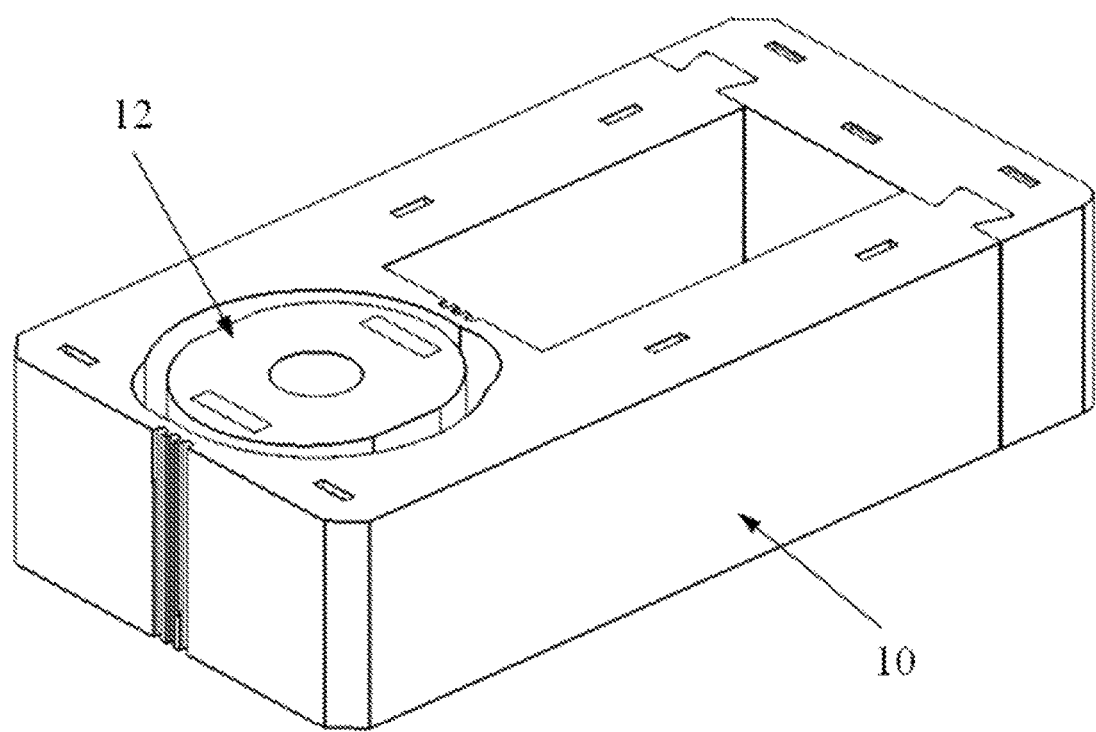
FIG. 1 illustrates a single phase permanent magnet motor according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 illustrates a single phase permanent magnet motor according to one embodiment of the present invention. The motor includes a stator core 10, windings (not shown) wound around the stator core 10, and a permanent magnet rotor 12 rotatably disposed in the stator core 10. Preferably, in this embodiment, the stator core 10 is generally U-shaped. The stator core 10 forms a pair of magnetic poles which interact with the magnetic poles of the rotor 12 to push the rotor 12 to rotate. In the figures, some parts of the motor, such as the windings, a control circuit for controlling the current of the windings, a motor housing or the like, are not shown, which can be constructed as in a known single phase permanent magnet motor.

Figure 2:
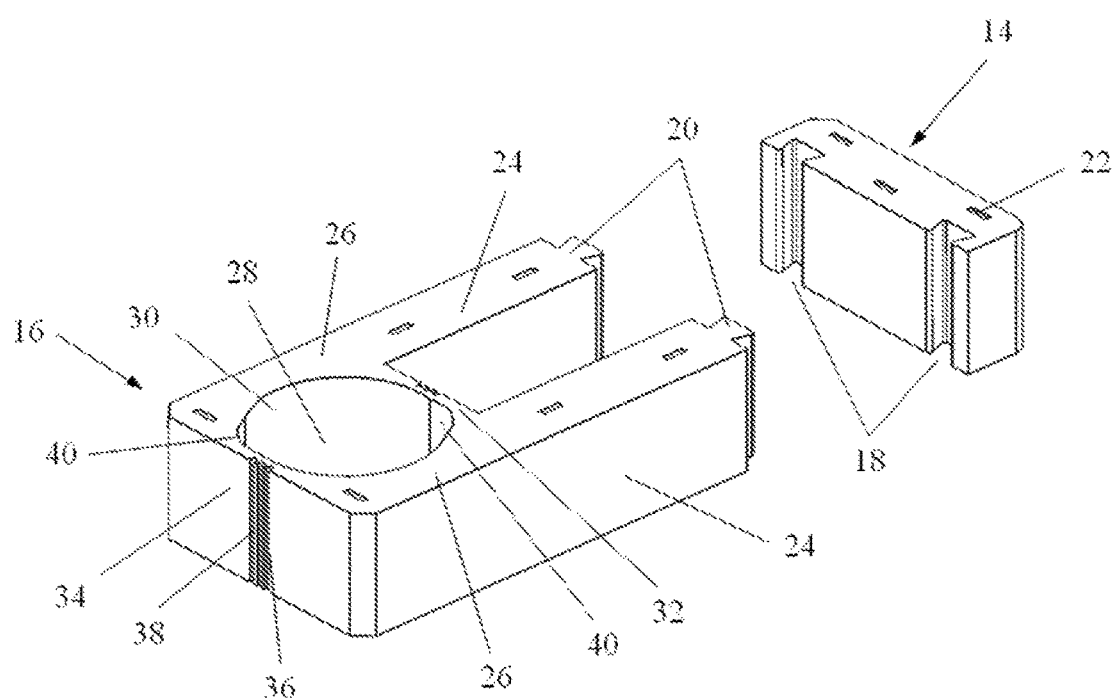
FIG. 2 is an exploded view of a stator core of the motor of FIG. 1.
Figure 4:
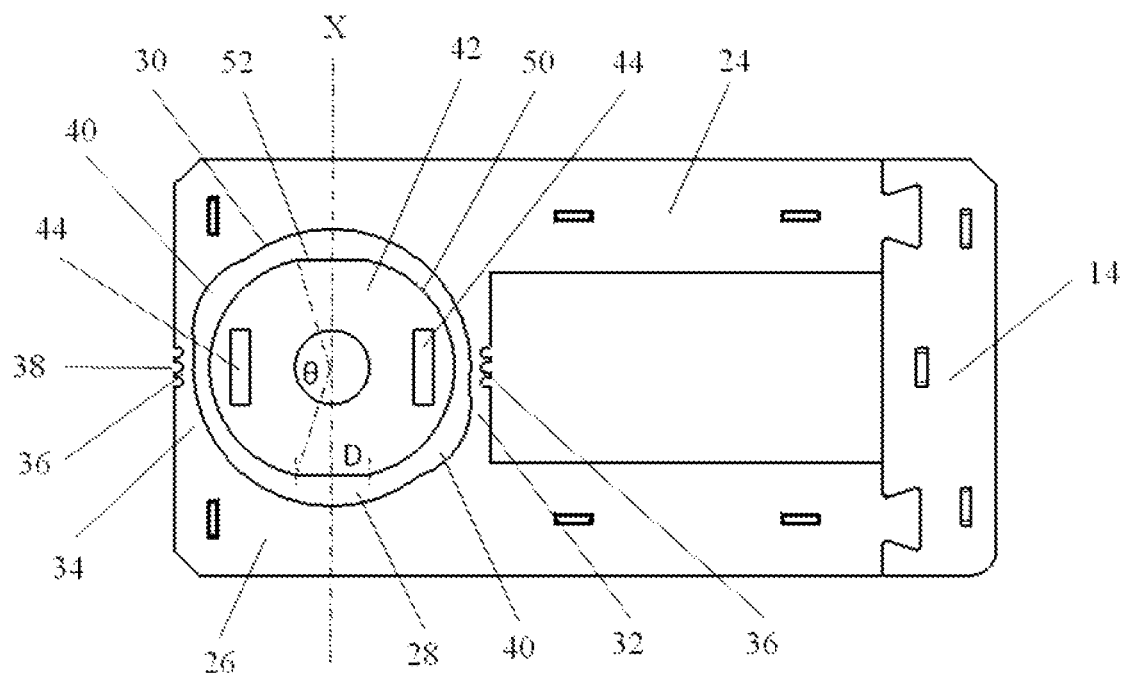
FIG. 4 is a top view of the motor of FIG. 1.

The stator core 10 may be made from a soft magnetic material such as ferrite. Referring to FIG. 2 and FIG. 4, the stator core 10 includes an end portion 14 and a pole arm 16 perpendicularly extending outwardly from the end portion 14. In this embodiment, the end portion 14 and the pole arm 16 are separately formed and then connected together through mechanical connections, which facilitate the winding process of the windings. The end portion 14 forms two locking grooves 18. The pole arm 16 projects outwardly to form corresponding locking blocks 20. The locking blocks 20 are respectively inserted into the locking grooves 18 along the axial direction to connect the pole arm 16 with the end portion 14. Preferably, the locking block 20 is dovetail shaped and the locking groove 18 has a shape matching the locking block 20, so that the connection between the locking block 20 and the locking groove 18 is strengthened, to avoid disengagement there between. In another embodiment, the locking grooves 18 may be formed in the pole arm 16, the locking blocks 20 are correspondingly formed on the end portion 14, and the pole arm 16 and the end portion 14 likewise are connected together to form the stator core 10.

Preferably, each of the end portion 14 and the pole arm 16 is made by stacking a plurality of laminations such as silicon steel sheets. The figures only illustrate the overall shapes of the end portion 14 and the pole arm 16 after the laminations are stacked, without showing specific structures of the multiple stacked layers. For facilitating the assembly of the laminations, each lamination is formed with a corresponding assembly hole 22. In this embodiment, the assembly hole 22 is a recessed blind hole and the lamination forms a protrusion corresponding to the blind hole. During stacking the laminations, the protrusion of one lamination is engaged in the assembly hole of an adjacent lamination so as to form a mechanical connection there between. The end portion 14 and the pole arm 16 are respectively formed by the methods.

In this embodiment, the pole 16 includes two connecting arms 24 and two pole claws 26 formed at distal ends of the connecting arms 24, respectively. The two connecting arms 24 are disposed in parallel with and are spaced from each other. An end face of each connecting arm 24 toward the end portion 14 projects outwardly to form one such locking block 20. The end portion 14 overall is in the form of a cuboid, with the locking grooves 18 formed in two sides thereof to connect with the locking blocks 20 of the two connecting arms 24. The two pole claws 26 are located away from the end portion 14 and function as a pair of magnetic poles of the stator core 10. Upon the windings being energized, the magnetic poles are polarized so that the two pole claws 26 have opposite polarities. The two pole claws 26 define a space 28 there between for receiving the rotor 12.

In this embodiment, each pole claw 26 has two circumferential ends that project laterally outwardly relative to the connecting arm 24 to respectively connected with two circumferential ends of the other pole claw 26, such that the two pole claws are connected to each other in the circumferential direction, and the space 28 is circumferentially closed and passes through the stator core 10 in the axial direction. The two pole claws 26 surround the space 28 and form a arc pole surface 30. The arc pole surface 30 is continuous in the circumferential direction and surrounds the rotor 12, with a continuous air gap formed between the arc pole surface 30 and the rotor 12, which effectively reduces the cogging torque, makes the rotor 12 rotation more smooth, and reduces noise of the motor. Preferably, the arc pole surface 30 is a generally standard cylindrical surface which is concentric with the rotor 12. A radial distance between the arc pole surface 30 and the rotor 12 is generally constant, thus resulting in the substantially even air gap and hence reducing the noise as much as possible.

Because the two pole claws 26 are connected together in the circumferential direction, the portions of the pole claws 26 extending outwardly from the connecting arms 24 form two wall portions 32, 34 between the two connecting arms 24. The two wall portions 32, 34, the two connecting arms 24 and the end portion 14 are connected one by one to form a magnetic path not passing through the rotor 12, which may result in magnetic leakage. To reduce magnetic leakage, a magnetic bridge 36 is formed at a middle of each wall portion 32, 34. A radial thickness of the magnetic bridge 36 is less than the radial thickness of other portion of the wall portions 32, 34 to reduce magnetic leakage. Preferably, a groove 38 is formed in an outer wall surface of the wall portion 32, 34 at a region corresponding to the magnetic bridge 36 defines at least one groove 38, to reduce the thickness of the area of the magnetic bridge 36 as much as possible. The groove 38 extends in the axial direction of the motor. There may be one or more grooves 38, a cross section of which may have a circular-arc shape or square shape.

Preferably, the arc pole surface 30 is recessed inwardly to form two startup grooves 40. The two startup grooves 40 are spaced 180 degrees in the circumferential direction, both being offset from a central axis X of the pole claw 26 by an angle (as shown in FIG. 4). The arc pole surface 30 of the pole claw 26 and the rotor 12 have the greatest air gap there between at the area of the startup groove 40, such that when the motor is powered off and the rotor stops rotation, a pole axis of the rotor 12 is offset from the central axis X of the pole claw 26 by an angle, thus avoiding the rotor stops at a dead point, thereby ensuring that the motor can be successfully started upon being energized.

Therefore, the substantially even air gap formed between the stator and the rotor refers to that the substantially even air gap is formed except at the area of the startup groove. In this embodiment, each startup groove 40 is at a large angle to the central axis X of the pole claw 26, and located adjacent one corresponding magnetic bridge 36.

Figure 3:
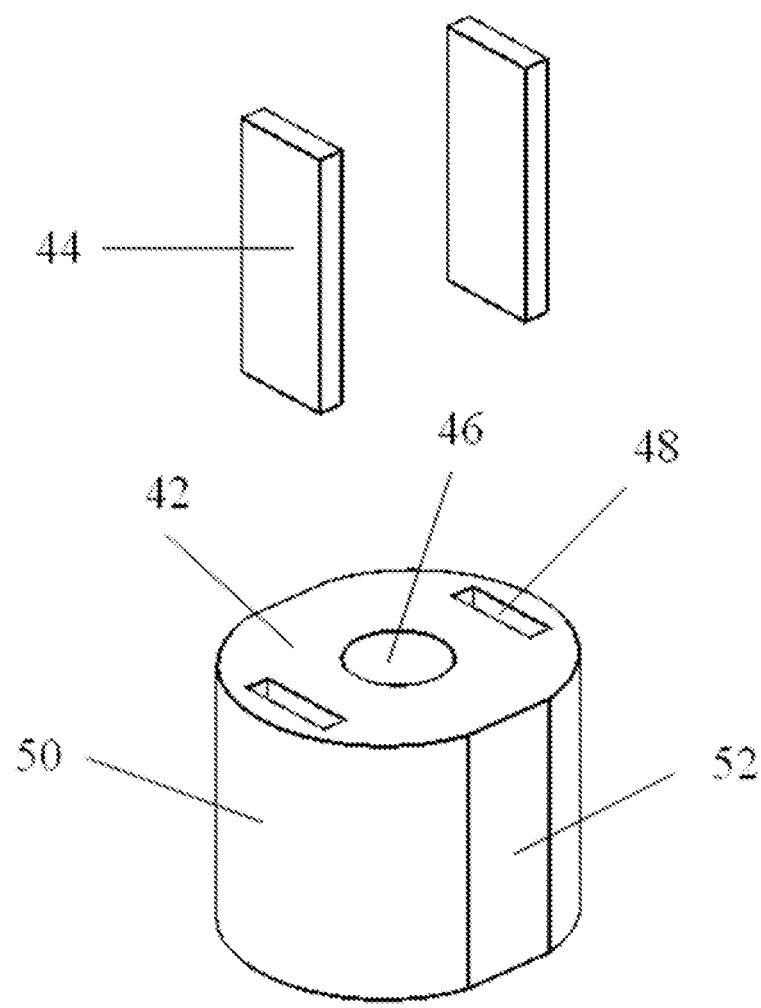
FIG. 3 is an exploded view of a permanent magnet rotor of the motor of FIG. 1.

Referring to FIG. 3 and FIG. 4, the permanent magnet rotor 12 includes a rotor core 42 formed by stacking laminations, and two permanent magnets 44 embedded in the rotor core 42. The two permanent magnets 44 have the opposite polarities, such that the rotor core 42 is magnetized to have a pair of magnetic poles which interact with the stator core 10 so as to push the rotor 12 to rotate. It is noted that the magnetic core of this present invention is made of a soft magnetic material including, but not limited to, ferrite.

The rotor core 42 may be formed by stacking a plurality of silicon steel sheets and may be overall in the form of a cylinder with a central shaft hole 46. The shaft hole 46 allows a rotary shaft to fixedly pass through to connect to a load and drive the load to rotate. Two axial through holes 48 are defined in the rotor core 42 and symmetrically located at opposite sides of the shaft hole 48, for receiving the permanent magnets 44. The through holes 48 each have a size and shape matching those of the permanent magnets 44. In this embodiment, the two permanent magnets 44 have a thin cuboid shape with a smaller radial thickness but with a larger tangential width. The two permanent magnets 44 are radially magnetized and disposed in parallel with and spaced from each other, both located adjacent an outer wall surface of the rotor core 42.

In this embodiment, the outer wall surface of the rotor core 42 is an axis-symmetry structure symmetrical about a central axis of the rotor 12, including two arc surfaces 50 and two plane surfaces 52 connected between the two arc surfaces 50. The two arc surfaces 50 act as the arc pole surface of the rotor. The two plane surfaces 52 can be used for positioning during subsequent processing or assembly. Each arc surface 50 corresponds to one corresponding permanent magnet 44 and completely covers the corresponding permanent magnet 44 in the circumferential direction.

In the above embodiment of the present invention, the permanent magnets 44 of the rotor 12 are inserted into the rotor core 42, which can increase the magnetic field intensity of the rotor and hence increase the power density of the motor. On the other hand, the two pole claws 26 of the stator magnetic 10 are connected together to form the continuous arc pole surface 30 in the circumferential direction, which avoids as much cogging torque as possible. The permanent magnet rotor 12 is formed by embedding the permanent magnets 44 into the rotor core 42, and the rotor core 42 is polarized to form two arc pole surfaces 50 having a central angle close to 180 degrees. Therefore, the rotor 12 can rotate smoothly, thus effectively reducing the noise. In addition, while the pole claws 26 of the stator core are connected together, the magnetic bridges 36 are formed at the middle of the wall portions 32, 34, and the radial thickness of the magnetic bridges 36 is less than the radial thickness of other sections of the wall portions 32, 34, thus reducing the magnetic leakage and ensuring the power efficiency. As a result, the single phase permanent magnet motor of the present invention has enhanced efficiency and reduced noise.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase permanent magnet motor comprising:
a stator core comprising an end portion and a pole arm extending from the end portion, the pole arm comprising two connecting arms connected to the end portion and two pole claws formed at distal ends of the connecting arms, and
a permanent magnet rotor rotatably disposed in the stator core between the two pole claws, the rotor comprising a rotor core and a plurality of permanent magnets embedded in the rotor core, and the rotor core being made of a magnetic material;
wherein an inner surface of the pole claws of the stator core is recessed inwardly to form two startup grooves, and the two startup grooves are offset from a central axis of the pole claws and are spaced 180 degrees in the circumferential direction.

2. The single phase permanent magnet motor of claim 1, wherein the permanent magnet has a thickness in a radial direction of the rotor less than a width in a tangential direction of the rotor.

3. The single phase permanent magnet motor of claim 2, wherein the permanent magnet has a thin cuboid shape.

4. The single phase permanent magnet motor of claim 1, wherein the at least one permanent magnet comprises two permanent magnets, and the two permanent magnets are disposed in parallel with and spaced from each other.

5. The single phase permanent magnet motor of claim 4, wherein an outer wall surface of the rotor core forms two arc surfaces corresponding to the two permanent magnets, respectively, and each arc surface covers a corresponding permanent magnet in a circumferential direction.

6. The single phase permanent magnet motor of claim 5, wherein the outer wall surface of the rotor core further comprises two plane surfaces connected between ends of the two arc surfaces.

7. The single phase permanent magnet motor of claim 1, wherein the two pole claws are connected together and form a wall portion between the two connecting arms, a magnetic bridge is formed at a middle of the wall portion, and the wall portion has a minimum radial thickness at the area of the magnetic bridge.

8. The single phase permanent magnet motor of claim 7, wherein an outer wall surface of the magnetic bridge is formed with at least one groove.

9. The single phase permanent magnet motor of claim 8, wherein the groove extends axially in the magnetic bridge.

10. The single phase permanent magnet motor of claim 1, wherein the end portion and the pole arm are respectively formed by stacking a plurality of laminations and are mechanically connected, one of the connecting arm of the pole arm and the end portion forms a locking groove, the other of the connecting arm of the pole arm and the end portion forms a locking block, and the locking block is engaged in the locking groove to connect the pole arm and the end portion.

* * * * *